(12) United States Patent
Nibbeling

(10) Patent No.: US 7,020,136 B1
(45) Date of Patent: Mar. 28, 2006

(54) SATELLITE TELECOMMUNICATION SYSTEM WITH STORAGE OF MESSAGES IN ELECTRONIC MAILBOXES

(75) Inventor: Henricus Theodorus Maria Nibbeling, Zoetermeer (NL)

(73) Assignee: Koninklijke Kpn N.V., Groningen (NL)

( * ) Notice: Subject to any disclaimer, the term of this patent is extended or adjusted under 35 U.S.C. 154(b) by 0 days.

(21) Appl. No.: 09/807,112

(22) PCT Filed: Nov. 16, 1999

(86) PCT No.: PCT/EP99/09045

§ 371 (c)(1),
(2), (4) Date: Apr. 6, 2001

(87) PCT Pub. No.: WO00/31897

PCT Pub. Date: Jun. 2, 2000

(30) Foreign Application Priority Data

Nov. 19, 1998 (NL) .................................. 1010597

(51) Int. Cl.
*H04L 12/56* (2006.01)

(52) U.S. Cl. ...................................... 370/389; 370/524

(58) Field of Classification Search ........ 370/389–397, 370/473, 470, 465, 316, 338, 524; 379/88.15, 379/67.1, 418, 412.1, 245, 198, 88.26; 455/459, 455/12.1, 445, 188.1, 513, 406, 428, 13.4; 358/408, 435; 340/988, 961, 7.6

See application file for complete search history.

(56) References Cited

U.S. PATENT DOCUMENTS

| | | | | |
|---|---|---|---|---|
| 3,641,432 A | * | 2/1972 | Bond | .................. 455/13.4 |
| 4,580,012 A | * | 4/1986 | Matthews et al. | .......... 379/245 |
| 4,757,525 A | * | 7/1988 | Matthews et al. | ....... 379/88.26 |
| 5,140,626 A | * | 8/1992 | Ory et al. | .................. 340/7.62 |
| 5,394,560 A | * | 2/1995 | Kane | ......................... 455/12.1 |
| 5,815,506 A | * | 9/1998 | Gokhale | ..................... 370/524 |

FOREIGN PATENT DOCUMENTS

| | | |
|---|---|---|
| EP | 0 849 925 | 6/1998 |
| WO | WO 97/21281 | 6/1997 |

OTHER PUBLICATIONS (International Search Report and Netherlands Search Report also submitted.

B. Cheng et al, "A New Type Optimized LEO Satellite Global Email Communication Network", IEEE Global Telecommunications Conference, Phoenix, Arizona, Nov. 3-8, 1997, pps. 1133-1137.

* cited by examiner

*Primary Examiner*—Chi Pham
*Assistant Examiner*—Prenell Jones
(74) *Attorney, Agent, or Firm*—Michaelson & Associates; Peter L. Michaelson

(57) ABSTRACT

Telecommunications system, particularly for exchanging telecommunication traffic between fixed and mobile users, such as lorry drivers, by way of a satellite communication network, such as the Inmarsat system, built up from several telecommunication satellites which are operatively coupled, by way of radio transmission links, to one or more earth stations. The earth stations are operatively connected, by way of a service centre, to an earth communication network built up from fixed and/or mobile telecommunication networks, messages received from users by way of the satellite communication network being stored in electronic mailboxes at the service centre.

27 Claims, 3 Drawing Sheets

SATELLITE TELECOMMUNICATION SYSTEM WITH STORAGE OF MESSAGES IN ELECTRONIC MAILBOXES

The invention relates to the exchange of telecommunication traffic between users in a telecommunications system, comprising a satellite communication network, such as the Inmarsat system, set up from a number of telecommunication satellites which are operatively coupled, by way of radio transmission links, to one or more earth stations, which earth stations are operatively connected, by way of a service centre, to an earth communication network constructed from fixed and/or mobile telecommunication networks.

The Inmarsat-satellite communication system originally is a communication network for exchanging telecommunication traffic between users on board sea-going vessels or other vessels and shore. For navigational purposes, the so-called "Global Positioning System (GPS)" has been developed, comprising accurately positioned satellites transmitting radio signals, on the basis of which so-called GPS receivers are capable of accurately determining their position on earth.

With the progression of the mobile radio transmission technique, particularly the miniaturisation of the transmission devices, the use of satellite communication has also come within reach of other users than sea-going vessels such as, e.g., on board lorries. By way of fixed and/or mobile telecommunication networks known per se, designated by abbreviations such as PSTN (Public Switched Telephone Network), ISDN (Integrated Services Digital Network) and GSM (Global System for Mobile communication), data traffic may be exchanged, through the intervention of earth stations, over a satellite communication network, such as the Inmarsat system, with users almost anywhere in the entire world.

A manager of a fleet of lorries may use this, e.g., to pass on loading and unloading information to a lorry driver or, conversely, receive information from the lorry, e.g., relating to the state of the load. If a lorry is provided with a GPS receiver, it may also be verified in a simple manner where the lorry in question is located at a certain point in time, or which route is being passed.

The so-called Inmarsat-D telecommunications system enables the exchange of messages between fixed and mobile users, it being possible, by way of the satellite communication network, to transmit a message to a (mobile) user having the option of a brief return message. Return messages comprise, e.g., a fixedly programmed receipt confirmation or a message initiated by an associated application.

Generally, the return message comprises an identification code of the (mobile) user, an address code relating to the destination of the message such as, e.g., a manager of a fleet of lorries, and information data. The information data may comprise, e.g., a simple confirmation of the receipt of a message, positional data, loading data etc.

In a practical implementation, the return messages may have, e.g., a size of 8 bytes (64 bits) and are transmitted at a bit rate of approx. 20 bits/s. The transmission of such a return message, therefore, takes but a few seconds. In the satellite communication network, for the transmission of such short messages a time-slot-oriented transmission protocol is applied which in the prior art is also known under the name of "Slotted Aloha".

For efficiently transmitting such short messages on the ground, special data communication facilities are required such as, e.g., a packet-switched data network operating according to the known X.25 protocol.

Upon transmission by way of an earth communication network such as, e.g., the PSTN or GSM, which are switched telecommunication networks having a customary bit transmission rate of 64 kbits/s, the time involved in setting up and breaking off a link is a multiple of the duration of the return message in question. From the viewpoint of efficient use of the network, this is an unfavourable ratio.

The invention is therefore based on the task of optimising the exchange of telecommunication traffic in a telecommunications system as referred to in the preamble in such a manner that short return messages received from users by way of the satellite communication network may be transmitted in a technically and economically efficient manner, not only by way of a special data communication network but also by way of, inter alia, fixed and/or mobile switched telecommunication networks The invention solves this in such a manner that messages received in the service centre from users by way of the satellite communication network are stored in electronic mailboxes.

The use of electronic mailboxes has the advantage that the relatively short return message may be collected therein and, e.g., periodically or automatically transmitted by way of any network at the request of a user as one total, larger message. It will be understood that this enables a more efficient use of the earth communication network, i.e., both in the event of switched connections and in the event of data connections, in which a link is set up on the basis of a so-called handshaking protocol.

Using electronic mailboxes according to the invention deviates from, e.g., the electronic mailboxes known from the Internet technology (e-mail), in which the starting point is not the efficient use of communication facilities, but rather the supposition that individual users are capable of communicating without messages getting lost due to their personal computer or other communication equipment being out of operation. Messages transmitted by way of e-mail or Internet mail often have a size of a few kbits, different from the return messages of 64 bits being exchanged, e.g., in the Inmarsat-D satellite communication.

In accordance with a further embodiment of the invention, messages received from a group of users such as, e.g., lorries of one and the same firm or manager of a fleet of lorries, may be stored in a common mailbox. Within a common mailbox, it is then possible once again to distribute the messages in question among separate mailboxes associated with specific users, e.g., on the basis of a received identification code and/or address code or part thereof.

Since users are generally associated with different telecommunication operators, and not every operator disposes of his own earth station, and each earth station in most cases has a direct communication link with only one or two satellites, in practice, in a service centre, return messages will be received intended for users associated with different telecommunication operators. That is to say, different operators in the same country or operators in different countries. By the way, this is also valid for the transmission of messages.

In a still further embodiment of the invention, a transparent and flexible exchange of telecommunication traffic between various telecommunication operators and users is provided in such away that in a common mailbox, messages are stored from users associated with one telecommunication operator. Subsequently, the telecommunication operators may themselves determine the way in which they will further transmit the messages stored in their mailbox.

Due to the use of mailboxes, both for the individual users and jointly for a group of users or a telecommunication operator, tariffing of the costs involved in the transmission of the messages may simply be coupled to the owner, or lessee of a mailbox in question, as the case may be. After all, there is an obvious "owner" of a message, namely the owner (contracting party) of the mailbox in question.

A simple way of tariffing is, e.g., the invoicing of a predetermined amount for each message delivered to a mailbox. In addition, a choice may be offered which message may be made available at what cost etc. Messages which are incapable of being stored in a mailbox (not even of a specific operator) are not capable of being addressed and may be "thrown away", so that no expenses need be incurred for storage or transmission of messages to, e.g., other operators.

Within the Inmarsat-D telecommunications system, address codes are available having a length of only 7 or 8 bits for addressing the destination of a return message. The length depends on the type of return message. It will be understood by those skilled in the art that in such short address codes no complete network address, including network types (PSTN, GSM, Datanet etc.) can be included. A direct translation, too, by way of a translation or lookup table, is limited to only 128 or 256 (7 or 8 bits, respectively) destination codes. For a world-spanning service, said number must be deemed too small.

In a preferred embodiment of the invention, therefore, a mailbox is selected on the basis of an address code, which is included in a message received, and an identification code associated with the user in question, a lookup table being available for an identification code and the address code referring to references included in the lookup table.

Within the system, the identification code of a user is unique, while the address codes for different users may be the same. Although the address codes used in practice have a limited size of 7 or 8 bits only, for each return message a large number of mailboxes are capable of being addressed in this manner.

In a still further embodiment of the invention, the lookup table comprises at least a first and a second address block, the one address block referring to a user-specific mailbox and the other address block referring to a mailbox common to a group of users, a mailbox in question being selected from the first or second address block on the basis of the address code received. That is to say, on the basis of an address code from, e.g., the first address block, the message in question will be delivered to the mailbox of an individual user and on the basis of a address code from, e.g., the second address block, the message in question will be stored in the common mailbox addressed by said address code. In this connection, the option is left open that address codes from the first and second address blocks may refer to the same mailboxes.

By using such common mailboxes for telecommunication operators, a high degree of privacy, is realised since the service centre need not be aware of the organisation and setup of the traffic of messages of an operator in question.

In the event of, e.g., a common mailbox per telecommunication operator, it may suffice to directly deliver the message into the common mailbox addressed by the second address block. Subsequently, the operator may also have a lookup table available for his mailbox, a message in question being capable of being stored in a user-specific mailbox on the basis of the identification code and/or address code.

Apart from a reference to a mailbox, the lookup table in a further embodiment of the invention comprises a third address block, in which references are included which relate to a group of most recently transmitted messages, such as messages transmitted from a fixed user (a manager of a fleet of lorries) to a mobile user (a lorry). To the messages, there may be assigned a sequence number, and a message in question may then be selected, e.g., on the basis of the address code.

A return message having an address code from the third address block is delivered into the mailbox of the sender who was recorded under the address code referred to in the third address block. As a result, the mobile station has an option to indicate that the return message is a reply to a message transmitted to a user in the satellite communication network. The return message is then stored in the addressed mailbox with a reference, e.g., the sequence number, to the transmitted message in question.

In order to make several services available to a user, in a further embodiment of the invention the lookup table is provided with a fourth address block, in which there are included references relating to services to be provided to a user. A service in question is then selected from the fourth address block on the basis of an address code, it being possible to think of, e.g., services such as providing an electronic mailbox for the messages to a mobile user, automatically retransmitting the most recently transmitted messages, retransmission at the request of a mobile user etc.

Other services which are possible using the storage in electronic mailboxes according to the invention comprise, inter alia, the immediate forwarding of a message to a network destination, the collection of messages and scheduled forwarding thereof, simply modifying the network destination by the owner of the mailbox, i.e., the network by way of which the messages must be delivered to the owner, modifying the number of messages to be collected etc.

Without mailbox, such provisions would have to be administrated, e.g., directly in a translation or lookup table at all registries relating to a destination address in question, which is awkward, to say the least, and comprises a potential source of errors. Using the invention, a destination need be administered only once, i.e., coupled to the mailbox.

In one embodiment of the invention, the lookup table comprises 128 sequentially numbered references, the first address block referring to the references numbered 0–31, the second address block referring to the references numbered 32–63, the third address block comprising the references 64–95 and the fourth and last address block the references 96–127 of the lookup table.

In order to prevent messages stored in a mailbox being capable of being read by unauthorised persons, in a further embodiment of the invention the messages are made available to authorised users only, i.e., upon request or automatically, with in the latter case clusters of messages being delivered to a user in the earth communication network. Such user may of course also be an operator, the messages being delivered, e.g., into an electronic mailbox of the operator in question. After a message has been transmitted, it may be erased from the mailbox.

The invention also relates to a device for exchanging, in a telecommunications system, telecommunication traffic between users, which telecommunications system comprises a satellite communication network such as the Inmarsat system, built up from a number of telecommunication satellites which are operatively coupled, by way of radio transmission links, to one or more earth stations, which earth stations are operatively connected, by way of a service centre, to an earth communication network, built up from fixed and/or mobile telecommunication networks, characterised by control means for storing, in electronic mailboxes, messages received from users in the service centre by way of the satellite communication network.

In accordance with a further embodiment of the device according to the invention, the control means are arranged for storing, in a common mailbox, the messages received from a group of users, e.g., a mailbox for the users of one and the same operator. It should be noted that a common mailbox, if so desired, may be located remotely from the service centre, e.g., in a management centre of an operator, the control means being capable of exchanging messages with the management centre by way of a suitable transmission link.

In accordance with further embodiments of the invention, the control means are arranged for selecting a message from a group of messages most recently transmitted to a (mobile) user, or for providing the user in question with special services, as the case may be.

By way of the control means, the messages stored in a mailbox may be transmitted at will to an authorised user or automatically, as the case may be, in, e.g., clusters of messages received. In addition, the control means may be arranged for tariffing services rendered to a user of a mailbox.

The invention additionally relates to a telecommunication unit, comprising user interface means and transmission means for exchanging telecommunication traffic between users in a telecommunications system, comprising a satellite communication network, such as the Inmarsat system, built up from a number of telecommunication satellites which are operatively coupled, by way of radio transmission links, to one or more earth stations, which earth stations are operatively connected, by way of a service centre, to an earth communication network built up from fixed and/or mobile telecommunication networks, a message transmitted by the telecommunication means comprising an address code, characterised in that the transmission device is arranged for transmitting an address code selected from a first or second address block comprising address codes which refer to a user-specific electronic mailbox or a common electronic mailbox for storing therein a message transmitted by the transmission device.

In a further embodiment, the transmission device of the telecommunication unit is arranged for transmitting an address code selected from a third address block, comprising references relating to a group of most recently transmitted messages, or a fourth address block, comprising references which relate to services to be provided to a user.

The invention is described in more detail below on the basis of the enclosed drawings.

FIG. 1 schematically shows a telecommunications system comprising a satellite communication network and an earth communication network.

Figure 4:
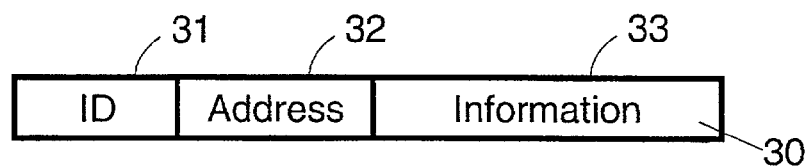

FIG. 4 schematically shows a typical layout of a message received by way of the satellite communication network.

Figure 5:
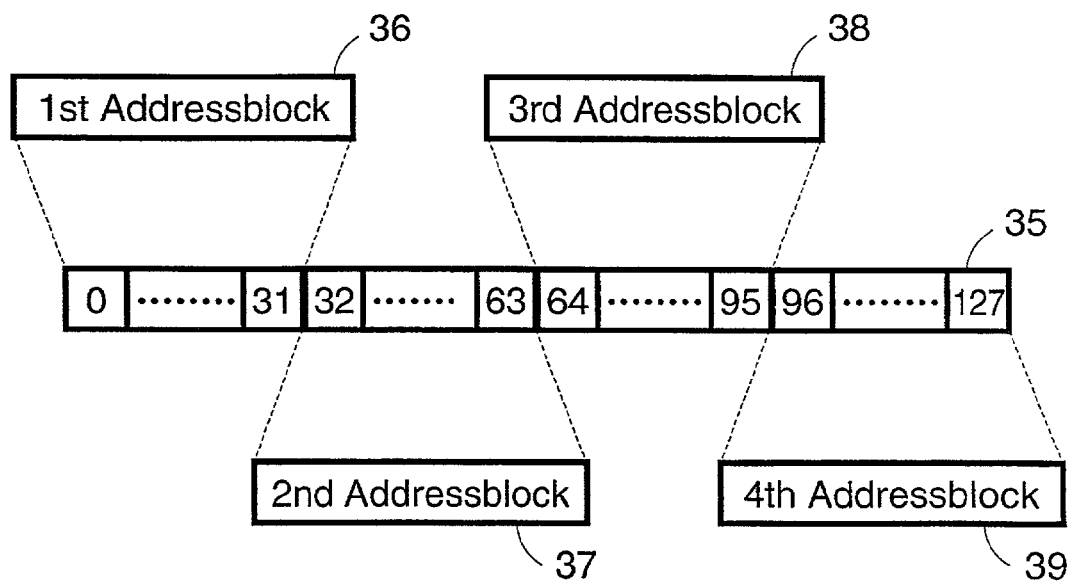

FIG. 5 schematically shows the layout of a lookup table according to a preferred embodiment of the invention.

The invention is illustrated below without detailed technical descriptions of the earth communication network or the fixed and mobile telecommunication networks thereof, as the case may be, and the satellite communication network. Only the elements required for a good understanding of the invention by those skilled in the art are explained in greater detail. For detailed information on said communication systems, reference is made to telecommunication manuals and textbooks which are readily available in practice.

Figure 1:
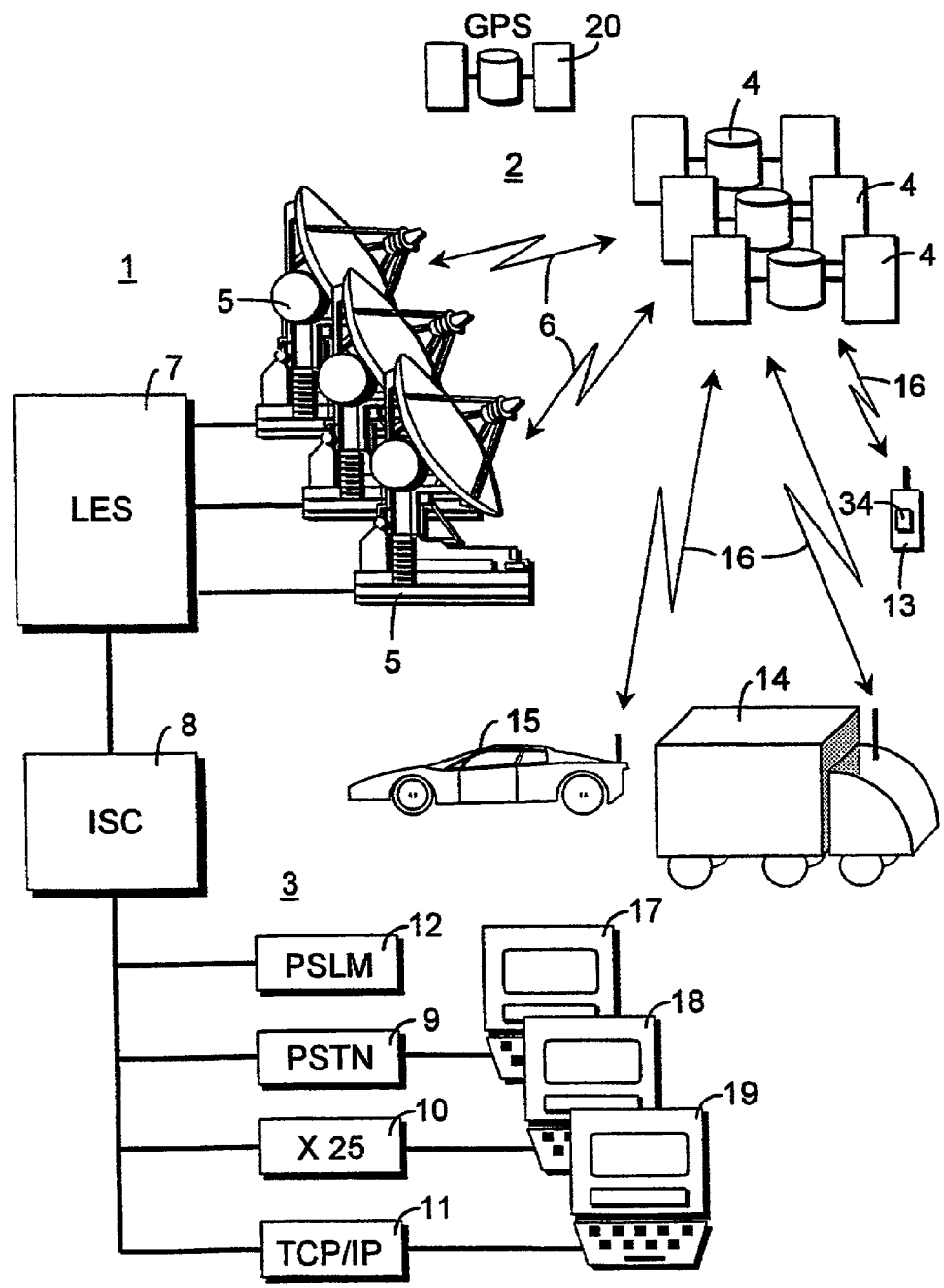

FIG. 1 shows a telecommunications system which in its entirety is designated by reference numeral 1, consisting of a satellite communication network 2 and an earth communication network 3.

The satellite communication network 2 comprises a number of communication satellites 4 such as, e.g., the satellites of the Inmarsat system, which communicate, by way of a radio link 6, with earth stations 5. The earth stations 5 are connected to a service centre 7. The combination of an earth station and a service centre is sometimes also designated by the term "Land Earth Station (LES)". To a service centre 7, there may be connected several earth stations 5. The communication satellites 4 may additionally be positioned in such a manner that an earth station 5 disposes of a direct radio communication link 6 with several communication satellites 4.

The service centre 7 is connected, by way of a gateway or "International Switching Centre (ISC)" 8, to the individual telecommunication networks of the earth communication network 3. The earth communication network generally comprises one or more "Public Switched Telephone Networks (PSTN)", Packet-Switched (PS) data networks 10 according to, e.g., the X.25 protocol, and, e.g., a data communication network exchanging traffic of messages in accordance with the Internet Protocol (TCP/IP) 11. Apart from the said, generally fixed, wire-bound telecommunication networks 9, 10, 11, the earth communication network 3 may also comprise one or more Public Switched Land Mobile (PSLM) networks. Said mobile networks may be, e.g., of the cellular type, according to Global System for Mobile (GSM) communications, such as GSM 900, GSM 1800, GSM 1900.

By way of the satellite communication network 2, users 13, 14, 15, who are located anywhere on earth within the coverage area of the satellite communication network 2, by way of a radio link 16 with a communication satellite 4, may exchange messages with users 17, 18, 19 who are connected to any of the telecommunication networks of the earth communication network 3. For the benefit of the invention, the users 17, 18, 19 are schematically represented by so-called Personal Computers (PCs).

The Inmarsat-D communication system has a setup as described above and shown in FIG. 1, data messages being capable of being transmitted by the users 17, 18, 19 of the earth communication network 3 to the (mobile) users 13, 14, 15, and the users 13, 14, 15 being capable of returning short return messages. Within the Inmarsat-D system there may be transmitted, to a user 13, 14, 15 in question, messages having a maximum information size of 250 bytes, while the users 13, 14, 15 may transmit return messages having a length of 8 bytes. The bit rate towards the users 13, 14, 15 amounts to 20 bits/s according to the Slotted Aloha protocol.

A typical application of the Inmarsat-D system is the one in which a manager of a fleet of lorries such as, e.g., user 17, may transmit messages to a driver of any of his lorries such as, e.g., user 14, the user 14 in question returning a short return message, e.g., as a confirmation of receipt. If equipped with a suitable receiver, the return message may also contain, e.g., positional information originating from signals from satellites 20 of the so-called Global Positioning System (GPS). The GPS per se is known in practice and requires no further explanation here. It is of course also possible to return messages (not shown) on the state of the load originating from sensors mounted in the lorry of the user 14.

In view of the relatively small size of the return messages, i.e., 64 bits in an embodiment of the Inmarsat-D system, the transmission time for transmitting to a user 17, 18, 19 such messages in a conventionally switched telephone network 9 in the event of a data transmission rate of, e.g., 64 kbits/s, amounts to only a few milliseconds. In such an event, the time for setting up a switched connection, however, amounts to a multiple of said message duration which, in terms of traffic, is an unfavourable, less efficient ratio.

Figure 2:
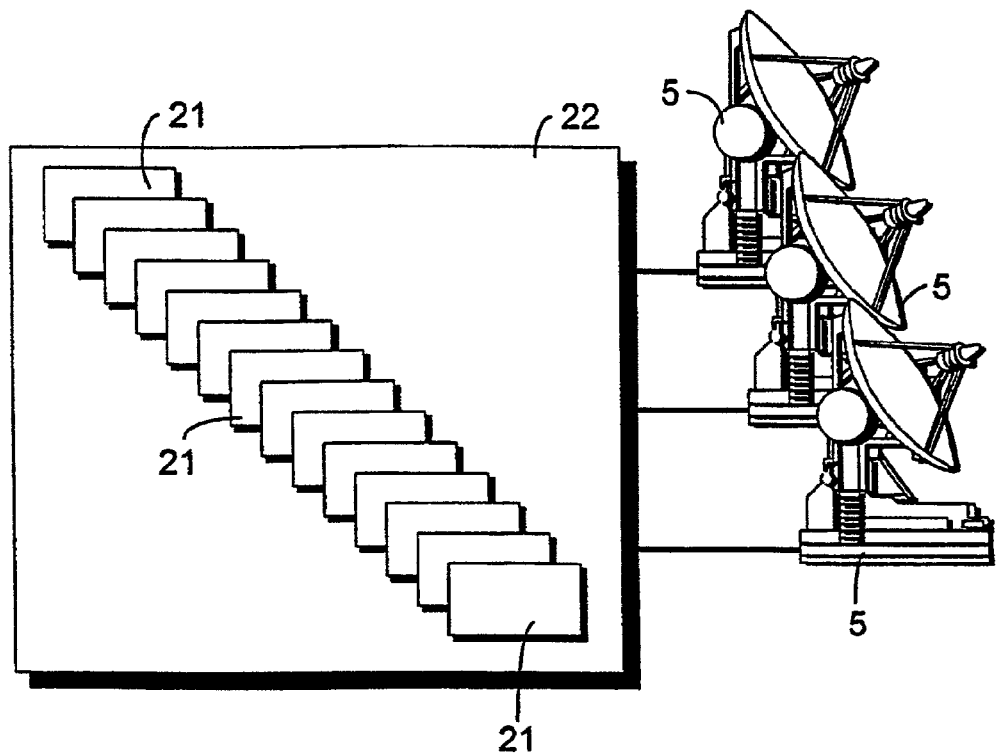
FIG. 2 shows, in the form of a block diagram, a first embodiment of the invention, messages received from the satellite communication network being stored in electronic mailboxes.

FIG. 2 schematically shows a first embodiment of the solution according to the invention, the return messages received by way of the earth stations 5 being stored in electronic mailboxes 21 under the control of control means 22 which are coupled in, or directly to, the service centre 7. An electronic mailbox 21 in practice is formed by a sub-memory of a larger memory space of a data-storage system. The mailboxes 21 may vary in memory size, depending on the needs of a user in question. Of course, a cost structure as a function of the available memory space may be used.

Figure 3:
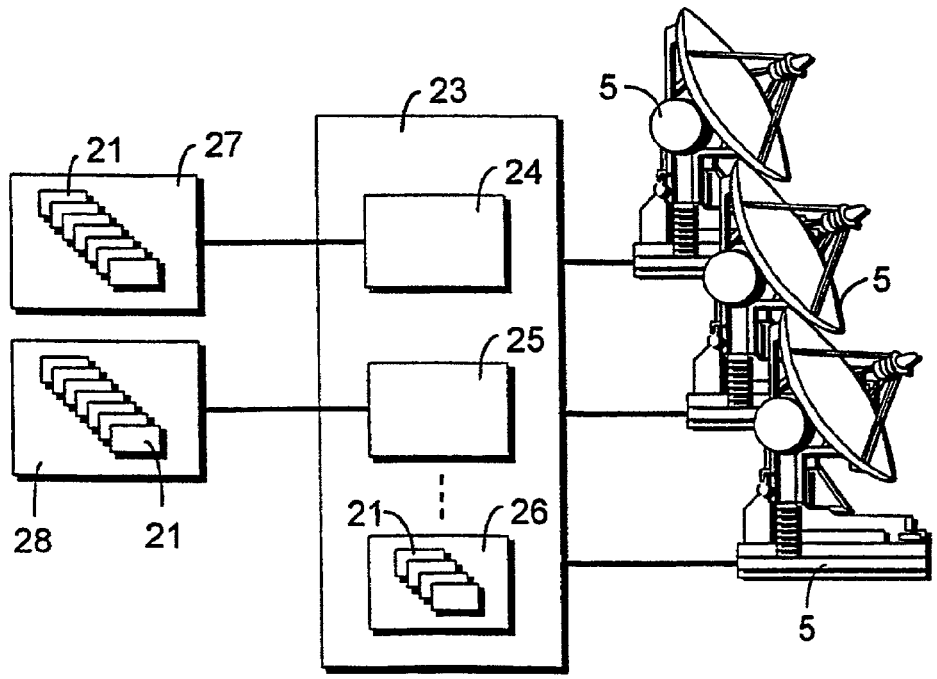
FIG. 3 shows, in the form of a block diagram, a second embodiment of the invention, in which messages received from the satellite communication network are stored in common electronic mailboxes.

Apart from electronic mailboxes 21 for individual users, the invention provides for a second embodiment, messages received from various users being stored, by way of an earth station 5, in a common electronic mailbox 24, 25, 26, as schematically shown in FIG. 3.

In this embodiment, there are shown common electronic mailboxes 24, 25, 26, in which messages are stored by way of control means 23. As illustrated on the basis of the common mailbox 26, these in their turn may be subdivided into separate, individual mailboxes 21.

The use of common mailboxes is of advantage, e.g., for a manager of a fleet of lorries, who wants to receive the messages from all of his lorries in one and the same mailbox.

In practice, the users 13, 14, 15 may be subscribers or users of telecommunication facilities of various telecommunication operators in the same country or in different countries. By assigning, to each telecommunication operator, an own common mailbox 24, 25, 26, the messages received, by way of the earth stations 5, from subscribers or users associated with an operator in question, may be stored in the common electronic mailbox 24, 25, 26 of the operator in question.

The contents of a common mailbox of an operator may subsequently be transmitted, by way of a transmission link suitable for this purpose, e.g., using a data communication facility, such as a packet-switched data network 10, to the management centre (not shown) of the operator in question, in which the information may be once again stored in electronic mailboxes 27, 28, which are common for a number of users from a group of users and/or in mailboxes 21 of individual users or the subscribers of the operator in question, as the case may be.

It will be understood that the users associated with a specific telecommunication operator, as described above, may be capable, by way of one or more of the earth communication networks 9, 10, 11 or 12, of collecting information from, e.g., their individual mailbox 21.

Apart from the advantage of saving expensive telecommunication facilities, particularly in switched telecommunication networks, the use of electronic mailboxes according to the invention offers the advantage that all costs involved in the traffic of messages may be directly allotted to the owner or lessee of an individual mailbox 21, or a common mailbox 24, 25, 26, as the case may be. Messages which cannot be stored in a mailbox in question, cannot be addressed in the system and may be omitted.

FIG. 4 schematically shows the setup of a return message 30 received in the Inmarsat-D communication system from a user 13, 14, 15.

Each user 13, 14, 15 has an own identification code ID 31 having a size of 20 bits. For addressing a destination at which the message 30 in question must be delivered, there is available an address code 32 consisting of 7 bits. With this address code, therefore, there may be defined 128 different addresses. The remaining bits mainly comprise information and control data 33.

For delivering, in accordance with the invention, a message 30 at an address indicated by the address code 32 thereof, there is available an own lookup table for each unique identification code 31 in the control means 22. Said lookup table contains references which refer to a mailbox 21 in question, into which the message in question must be delivered. Per identification code 31, and therefore per user, there may thus be addressed a maximum of 128 different mailboxes 21 in the Inmarsat-D system. Instead of individual mailboxes 21, of course there may also be addressed common mailboxes 22, 23, 24 having an address code in question.

FIG. 5 shows a practical embodiment of a lookup table 35 according to the invention.

In this connection, the address code 32 is broken down into four address blocks, 36, 37, 38 and 39 respectively, each of which contains 32 references.

As shown, the first address block 36 refers to the first 32 references, numbered 0–31; the second address block 37 refers to the subsequent 32 references, numbered 32–63; the third address block 38 relates to references following the second address block, numbered 64–95; and the fourth address block 39 refers to the references 96–127.

The references corresponding to the first address block 36 of the lookup table 35 refer to individual mailboxes 21; the references corresponding to the second address block from the lookup table 35 refer to common mailboxes 24, 25, 26, while the third address block 38 corresponds to references which identify a specific message from the most recently transmitted messages; and the fourth address block comprises references to a specific service such as, e.g., repeating several of the most recently transmitted messages etc.

Upon receipt of a message 30 from a user, a lookup table 35 in question is consulted, by the control means 23 on the basis of the identification code 31 received, a lookup table 35 in question. Using the address code 32 received, it is then analysed in which individual and/or common mailbox the message must be stored, using the first and second address blocks 36, 37, respectively, whether messages must be selected, in accordance with the third address block 38, and whether special services are requested, such as repeating messages indicated by the fourth address block 39.

Whenever maximum privacy is desired, the second address block 37 according to the invention may also be arranged in such a manner that it unequivocally refers to a number of common mailboxes 24, 25, 26 which, e.g., are assigned to telecommunication operators. When in such a case, a message 30 is received, the control means 23 will only need to analyse the second address block to deposit the message in question in the correct common mailbox. The identification code 31 then needs not be investigated. Within the common mailbox in question, such as the mailbox 24 or the mailboxes 26, 27 located at a telecommunication operator, there may then once again subsequently be available a lookup table 35 in which an eventual individual mailbox 21 is selected on the basis of the identification code 31.

For subsequently collecting messages from a mailbox in question, it is possible to adhered to authorisation and identification methods known per se, such as the application of personal identification numbers, which does not require any further explanation for those skilled in the art.

A telecommunication unit suitable for applying the invention, with which a user 13, 14, 15 is equipped, comprises transmission means 34 which, apart from exchanging telecommunication traffic with the satellite communication network 2, are also arranged for transmitting an address code for selecting an individual electronic mailbox 21 in question and/or a common electronic mailbox 24, 25, 26 (see FIG. 1). In the preferred embodiment of the invention, the transmission means 34 contain address codes from the first address block 36 or the second address block 37, respectively. The address codes in question may be programmed into a telecommunication unit in a fixed manner, or be transmitted as a function of an application in question.

When, e.g., a manager of a fleet of lorries requests information on the route, said information may be stored in a first mailbox, while information on the state of the load is deposited in a second, third or further mailbox.

When the option is offered of repeating messages for a user 13, 14, 15 in question and/or render special services, the transmission means 34 of the telecommunication unit according to the invention are also further arranged for selecting the address codes from the third address block 38 or the fourth address block 39, respectively.

Although in the above the invention is described on the basis of the Inmarsat-D system, it will be understood that the application of the invention is not limited to this specific system. In addition, fixed users, too, may exchange messages by way of the satellite communication network 2 with users of the earth communication network 3.

The invention claimed is:

1. Method for exchanging telecommunication traffic between users in a telecommunications system, comprising a satellite communication network, built up from several telecommunication satellites which are operatively coupled, by way of radio transmission links, to one or more earth stations, which earth stations are operatively connected, by way of a service center, to an earth communication network built up from fixed and/or mobile telecommunication networks, characterized in that messages having an address code short to such a degree that no complete network address can be included, and received in the service center from users by way of the satellite communication network, are stored in electronic mailboxes, said messages being distributed among the mailboxes on the basis of an address code or part thereof, by way of at least one lookup table and the address code referring to a reference included in the lookup table.

2. Method according to claim 1, characterized in that messages received from a group of users are stored in a common mailbox.

3. Method according to claim 2, characterized in that messages from users associated with a telecommunication operator are stored in a common mailbox.

4. Method according to claim 3, characterized in that, in a common mailbox, messages are stored distributed over separate mailboxes.

5. Method according to claim 1, characterized in that a mailbox is selected on the basis of said address code included in a message received and an identification code associated with the user in question.

6. Method according to claim 5, characterized in that the lookup table comprises at least a first and a second address block, the one address block referring to a user-specific mailbox and the other address block referring to a mailbox common to a group of users, a mailbox in question being selected from the first or second address block on the basis of the address code received.

7. Method according to claim 6, characterized in that the lookup table comprises a third address block in which references are included relating to a group of most recently transmitted messages.

8. Method according to claim 7, characterized in that the lookup table comprises a fourth address block in which references are included relating to services to be rendered to a user, a service in question being selected on the basis of the address code received.

9. Method according to claim 8, characterized in that the lookup table comprises consecutively numbered references, the first address block referring to the first references having the lowest sequence numbers, the second address block referring to the next 32 references, the third address block referring to the still following 32 references, and the fourth address block referring to the 32 references having the highest sequence numbers.

10. Method according to claim 1, characterized in that the messages stored in a mailbox may be transmitted to an authorized user on demand.

11. Method according to claim 1, characterized in that the messages stored in a mailbox are transmitted automatically to an authorized user, in clusters of messages, if so required.

12. Method according to claim 1, characterized by a user's account associated with an electronic mailbox, for crediting thereto the costs involved in receiving, storing and transmitting messages.

13. Device for exchanging, in a telecommunications system, telecommunication traffic between users, which telecommunications system comprises a satellite communication network, built up from several telecommunication satellites which are operatively coupled, by way of radio transmission links, to one or more earth stations, which earth stations are operatively connected, by way of a service center, to an earth communication network built up from fixed and/or mobile telecommunication networks, characterized by control means for storing in electronic mailboxes messages, having an address code being short to such an extent that no complete network address can be included and received in the service center from users by way of the satellite communication network, the control means distributing said messages among the mailboxes on the basis of an address code or part thereof, by way of a lookup table and the address code referring to a reference included in the lookup table.

14. Device according to claim 13, characterized in that the control means are arranged for storing, in a common mailbox, messages received from a group of users.

15. Device according to claim 13, characterized in that the control means are arranged for selecting a mailbox on the basis of said address code included in a message received and an identification code associated with a user in question, the control means comprising an identification-code-related lookup table provided with references to mailboxes for selecting said reference or mailbox, as the case may be, on the basis of said address code and identification code received.

16. Device according to claim 15, characterized in that the lookup table comprises at least a first and a second address block, the one address block referring to a user-specific mailbox and the other address block referring to a mailbox common to a group of users, the control means being arranged for selecting, from the first or second address block on the basis of an address code received, an individual or common mailbox in question for storing a message received therein.

17. Device according to claim 16, characterized in that the lookup table comprises a third address block, in which references are included which relate to a group of most recently transmitted messages, the control means being arranged for selecting a message on the basis of an address code received.

18. Device according to claim 17, characterized in that the lookup table comprises a fourth address block, in which references are included which relate to services to be rendered to a user, the control means being arranged for selecting a service in question on the basis of an address code received.

19. Device according to claim 13, characterized in that the control means are arranged for, if so requested, transmitting to an authorized user messages stored in a mailbox.

20. Device according to claim 13, characterized in that the control means are arranged for automatically transmitting, to an authorized user, messages stored in a mailbox.

21. Device according to claim 19, characterized in that the control means are arranged for erasing stored messages after the transmission thereof from the mailbox.

22. Device according to claim 13, characterized in that the mailboxes and the control means are mounted in the service center.

23. Device according to claim 13, characterized in that the control means are arranged for storing, by way of a transmission link, messages received in remotely located mailboxes.

24. Device according to claim 13, characterized in that the control means are arranged for tariffing services rendered to a user.

25. Telecommunication unit, comprising user interface means and transmission means for exchanging telecommunication traffic between users in a telecommunications system, comprising a satellite communication network, built up from several telecommunication satellites which are operatively coupled, by way of radio transmission links, to one or more earth stations, which earth stations are operatively connected, by way of a service center, to an earth communication network built up from fixed and/or mobile telecommunication networks, a message transmitted by the transmission means having an address code being short to such an extent that no complete network address can be included, and the messages received in the service center from users by way of the satellite communication network being stored in electronic mailboxes, the transmission means being arranged for distributing said messages among the mailboxes on the basis of an address code or part thereof by way of a lookup table and the address code referring to a reference included in the lookup table.

26. Telecommunication unit according to claim 25, characterized in that the transmission means are arranged for transmitting an address code selected from a first or second address block, comprising address codes which refer to a user-specific electronic mailbox or a common electronic mailbox for storing therein a message transmitted by the transmission means.

27. Telecommunication unit according to claim 26, characterized in that the transmission means are arranged for transmitting an address code selected from a third address block, comprising references relating to a group of most recently transmitted messages, or a fourth address block, comprising references relating to services to be rendered to a user.

* * * * *